United States Patent
Morales (10) Patent No.: US 11,526,317 B1
(45) Date of Patent: Dec. 13, 2022

(54) METHODS AND SYSTEM FOR ENABLING PREVIEWS FOR AN EMBEDDED DIGITAL FRONT END OF A PRINTING DEVICE

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/374,334

(22) Filed: Jul. 13, 2021

(51) Int. Cl.
*G06F 15/00* (2006.01)
*G06F 3/12* (2006.01)

(52) U.S. Cl.
CPC ............ *G06F 3/1256* (2013.01); *G06F 3/126* (2013.01); *G06F 3/1207* (2013.01); *G06F 3/1268* (2013.01); *G06F 3/1287* (2013.01); *G06F 3/1293* (2013.01)

(58) Field of Classification Search
CPC ...... G06F 3/1256; G06F 3/1207; G06F 3/126; G06F 3/1268; G06F 3/1287; G06F 3/1293

USPC ........................................................ 358/1.15
See application file for complete search history.

(56) References Cited

U.S. PATENT DOCUMENTS

| 8,386,945 | B1 | 2/2013 | Hansen et al. | |
|---|---|---|---|---|
| 2016/0259606 | A1* | 9/2016 | Aoki | G06F 3/1247 |
| 2018/0101339 | A1* | 4/2018 | Semouchine | G06F 3/1208 |

* cited by examiner

*Primary Examiner* — Mark R Milia
(74) *Attorney, Agent, or Firm* — Millen, White, Zelano & Branigan, P.C.; William Nixon (57) ABSTRACT

An embedded digital front end (DFE) of a printing device receives print jobs of documents from client devices. The print jobs are placed in a job queue within the DFE. Along with a received print job, the DFE also receives a graphic file corresponding to the print job. The graphic file is stored in a data storage on the DFE. The DFE provides the graphic file to a user interface connected to the DFE, to represent the print job. The user interface allows modifications be made to the job queue using the graphic files for the print jobs. Further, a client device connects to the user interface to modify the print order within the job queue.

20 Claims, 7 Drawing Sheets

METHODS AND SYSTEM FOR ENABLING PREVIEWS FOR AN EMBEDDED DIGITAL FRONT END OF A PRINTING DEVICE

FIELD OF THE INVENTION

The present invention relates to enabling a print job preview using graphic files associated with received print jobs in a job queue of an embedded digital front end for a printing device.

DESCRIPTION OF THE RELATED ART

Server digital front ends (DFEs) for production printing devices generally have high performance processing units with many cores and a large amount of memory. The computer resources available to server DFEs are used to provide both raster image processing and ancillary document management services that are common in modern production print DFEs. A feature in server DFEs that is not generally available in embedded DFEs may be robust job management and job queues. Although embedded DFEs may have the capacity to queue jobs and to perform job operations typical of server DFEs, they may not have the performance capabilities required to provide the rich functionality found server DFEs.

For example, conventional DFE user interfaces allow users to see document previews that can be used for job identification in some cases to see a preview of the final document before inline finishing. Embedded DFEs, which use low cost processors and have limited memory, may not have the spare processing power and memory to generate previews for all print jobs in the system. For this reason, embedded DFEs may not implement this functionality despite document previews being an integral part of print job management.

SUMMARY OF THE INVENTION

A printing system is disclosed. The printing system includes an embedded digital front end (DFE) for a printing device. The embedded DFE includes a job queue for a plurality of print jobs received at the printing device. The printing system also includes a client to submit a print job to the embedded DFE for placement in the job queue. The client generates a document file for the print job and a graphic file for the print job. The printing system also includes a user interface that communicates with the embedded DFE and displays a plurality of graphic files corresponding to a plurality of print jobs in the job queue. An input to the user interface modifies an order of the plurality of print jobs in the job queue. The embedded DFE receives the print job and the graphic file from the client. The print job for the document file is placed in the job queue with the plurality of print jobs. The graphic file of the print job is used by the embedded DFE to indicate the print job within the user interface.

A method for managing a job queue at a printing device is disclosed. The method includes creating a print job for a document file at a client. The method also includes generating a graphic file for the print job. The graphic file corresponds to the document file. The method also includes receiving the print job at an embedded digital front end (DFE) of the printing device. The method also includes placing the print job in the job queue with a plurality of print jobs. The method also includes displaying the graphic file for the print job within a user interface to indicate a position in the job queue with the plurality of print jobs. The method also includes modifying an order of the print job within the job queue using the graphic file.

A method for managing a job queue at a printing device is disclosed. The method includes creating a print job for a document file at a client. The method also includes receiving the print job at an embedded digital front end (DFE) of the printing device. The method also includes placing the print job in the job queue with a plurality of print jobs. The method also includes determining that the print job does not include a graphic file. The method also includes generating a graphic file for the print job. The graphic file corresponds to the document file. The method also includes displaying the graphic file for the print job within a user interface to indicate a position in the job queue with the plurality of print jobs. The method also includes modifying an order of the print job within the job queue using the graphic file.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enable job preview generation in a low cost embedded DFE by using the computing resources in clients to perform this task for the embedded DFE. When clients define a new print job to submit to the DFE, they may define two items. One item is the PDL file or files that will be part of the print job. The other item is job processing instructions, such as hold, print, quantity, paper, and the like, that are used to produce the print job. In addition to these items, the client also may generate a thumbnail of the print job. The client will use this thumbnail to show the print job to the operator locally.

When the client submits the print job to the embedded DFE, it will submit both the print job file as well as the preview, or thumbnail, file. For production printing, clients may send the print job to be held at the printing device. The press operator then will use either the same client or the local user interface to identify and release print jobs. To release the print job, the operator may use the local user interface to identify print jobs within the job queue. The user interface will have thumbnails for all print jobs submitted by the client. Further, if another client connects to the embedded DFE, then the new client will be able to see the thumbnails for all print jobs submitted from other clients. Thus, the disclosed embodiments allow for tracking using the thumbnails, which provide visual information on pending print jobs within the embedded DFE.

Figure 1A:
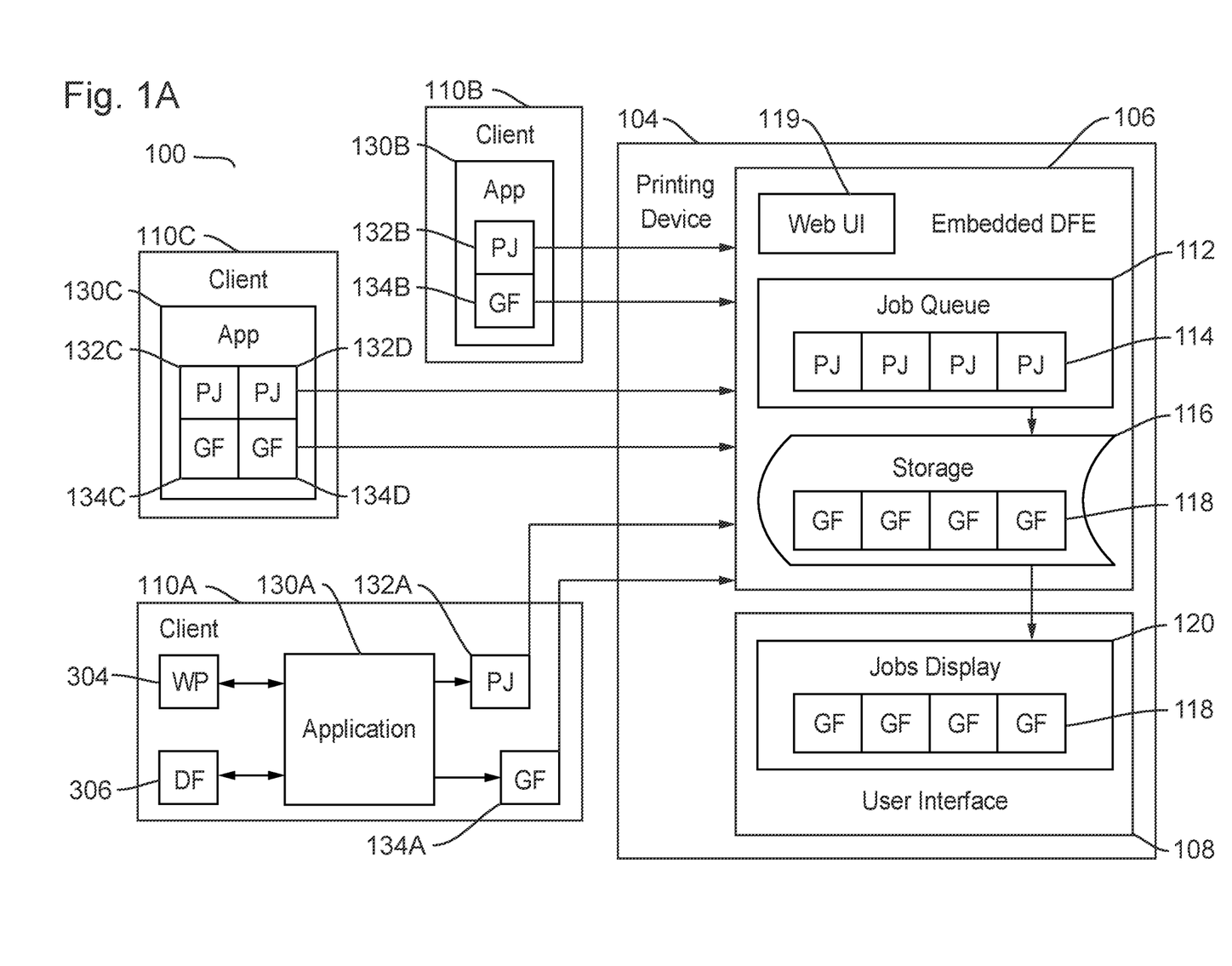
FIG. 1A illustrates a block diagram of a printing system according to the disclosed embodiments.

FIG. 1A depicts a printing system 100 having a printing device 104 according to the disclosed embodiments. Printing system 100 includes printing device 104 that received print jobs from client devices 110A, 110B, and 110C. Client devices 110A-C may be any device capable of executing applications and programs to generate documents and files, such as, for example, a computer, a laptop computer, mobile device or tablet, smart phone, kiosk, and the like. Client devices 110A-C may send print jobs to printing device over one or more networks implemented within printing system 100.

Printing device 104 is disclosed in greater detail below. It includes embedded digital front end (DFE) 106, or printing device controller, that is the workflow touchpoint which accepts a print job, or print file, commonly a PDF or PostScript file. DFE 106 converts the file of the print job into a format that print engine 260, disclosed below, can use to lay down the content of the document corresponding to the print job on a media. DFE 106 may include a raster image processor (RIP) as well as other components.

Figure 1B:
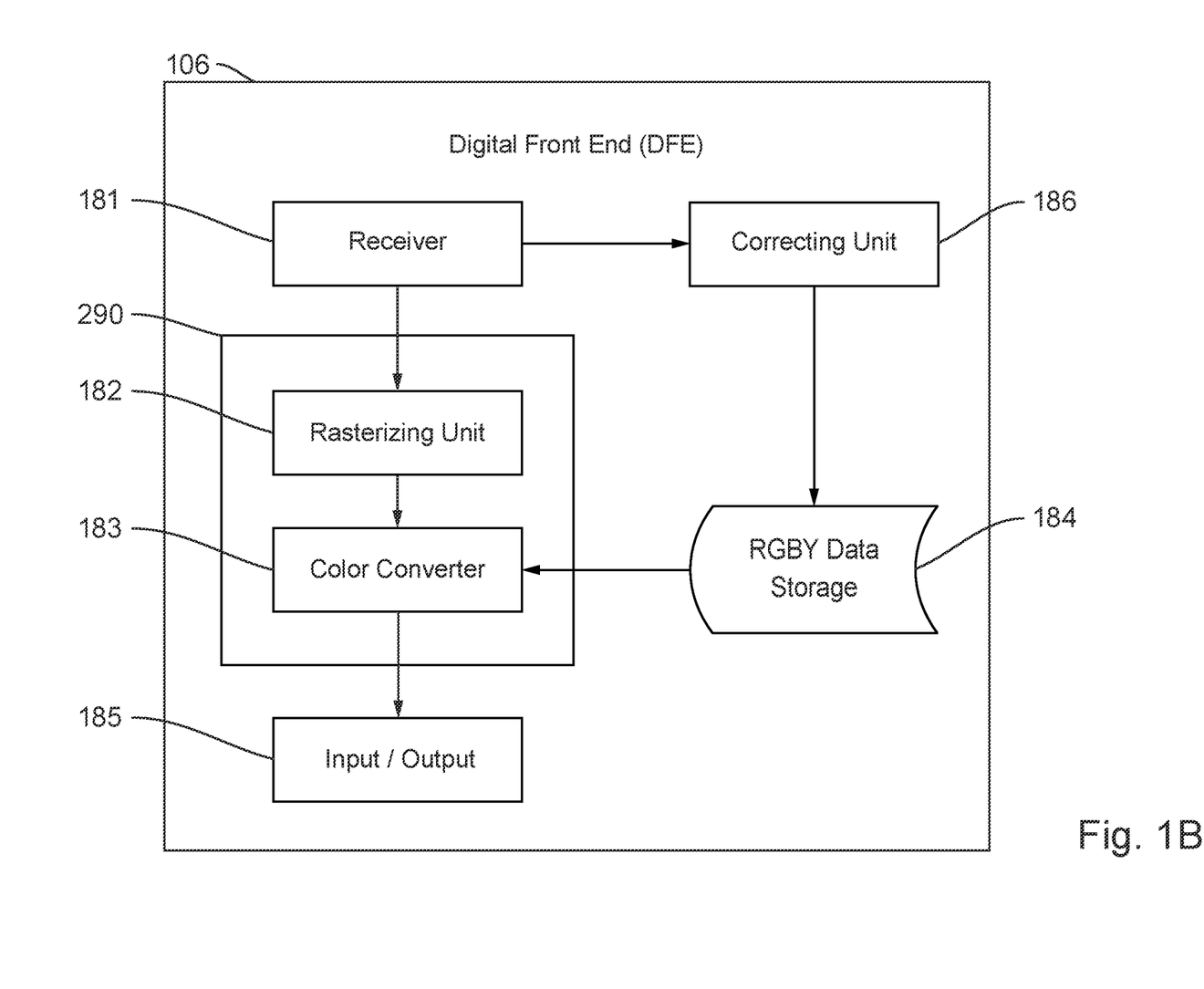
FIG. 1B illustrates a block diagram of an embedded digital front end for a printing device according to the disclosed embodiments.

FIG. 1B depicts a block diagram of DFE 106 according to the disclosed embodiments. DFE 106 includes a receiver 181, an RIP firmware 290 including rasterizing unit 182 and a color converter 183, an RGBY data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also includes job queue 112 and data storage 116.

Receiver 181 receives a print job generated by client devices 110A-C and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) stored in RGBY data storage 184. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 include rasterizing unit 182 and color converter 183. The rendering data generated by RIP firmware 290 is transmitted within printing device 104 via input/output connector 185. The print condition information and the print medium type, as well as the rendering data, may be transmitted to engine 260.

Referring back to FIG. 1A, DFE 106 also includes job queue 112. Job queue 112 includes print jobs 114 received for processing as disclosed above. Print jobs 114 may be received from client device 110A-C. Job queue 112 may place them in an order for printing on printing device 104. DFE 106 also includes data storage 116 that stores graphic files 118 associated with print jobs 114. Each print job received at DFE 106 includes a graphic file that is used to show the print job locally, such as in user interface 108. In some embodiments, graphic files 118 are thumbnails of print jobs 114.

For example, client device 110A includes application 130A that generates a print job 132A of one or more documents to print at printing device 104. Along with the document file for print job 132A, application 130A generates graphic file 134A based on print job 132A. This process may be repeated at client device 110B and 110C. Client device 110B includes application 130B that generates print job 132B for one or more documents to be printed on printing device 104. It also generates graphic file 134B based on print job 132B. Client device 110C may include application 130C that generates print job 132C and print job 132D. Graphic files 134C and 134D may be generated as well and associated with print jobs 132C and 132D, respectively.

When a client device define a new print job to submit to DFE 106, it may define the print description language (PDL) files that are part of the print job and job processing instructions, such as hold, print, quantity, media, and the like that will be used to produce the print job. These instructions may be part of the print condition and the print medium type information disclosed above. Along with these instructions and information, a graphic file is generated that is specific to the print job. The graphic file may uniquely identify the print job within printing system 100 and at printing device 104.

When the client device submits the print job to DFE 106, it also submits the document file and the graphic file. Thus, client device 110A submits print job 132A with graphic file 134A to DFE 106. Client device 110B submits print job 134B with graphic file 134B to DFE 106. Client device 110C submits print job 132C with graphic file 134C and print job 132D with graphic file 134D. Print jobs 132A, 132B, 132C, and 132D are received and placed into job queue 112 as print jobs 114. Graphic files 134A, 134B, 134C, and 134D are received and placed into data storage 116 at DFE 106 as graphic files 118.

For production printing, client device 110A-C may send print jobs 132A-D to be held at printing device 104. The operator may use the same client or a local user interface to identify and release the print jobs. Thus, printing device 104 may include user interface 108 that displays print jobs. According to the disclosed embodiments, the associated graphic file is displayed at user interface 108 in the order within job queue of the associated print job. To release a print job, the operator may identify each print job 114 by its associated graphic file 118 in user interface 108. For example, user interface 108 may include jobs display 120 which displays graphic files 118 in the order of their respective print jobs 114. User interface 108 will have graphic files, or thumbnails, for all print jobs submitted to DFE 106.

For example, job queue 112 may have the following order of print job in DFE 106: 132A, 132C, 132B, and 132D. Graphic files 134A-D are stored in data storage 116 in any order. Within jobs display 120, however, graphic files for the print jobs also may have the following order 134A, 134C, 134B, and 134D. To release a print job, the operator may use jobs display 120 to identify the appropriate graphic file to be further processed within DFE 106 as disclosed above. For example, the operator may indicate print job 132B to be released by selecting graphic file 134B using user interface 108. In some embodiments, user interface 108 may be hosted by a client device, such as client device 110B, or another device connected to DFE 106.

In some embodiments, client devices 110A-C may be able to connect to DFE, 106 to review the pending print jobs in job queue 112. The operator may be able to see graphic files 118 for all print jobs submitted from other client devices. This feature may allow users to know the order of printing as well as provide thumbnails of the print jobs that identify them uniquely.

DFE 106 also includes web-based user interface 119. Web-based user interface 119 may be used in the generation of graphic files 118 for print jobs 114. This feature is disclosed in greater detail below.

Figure 2:
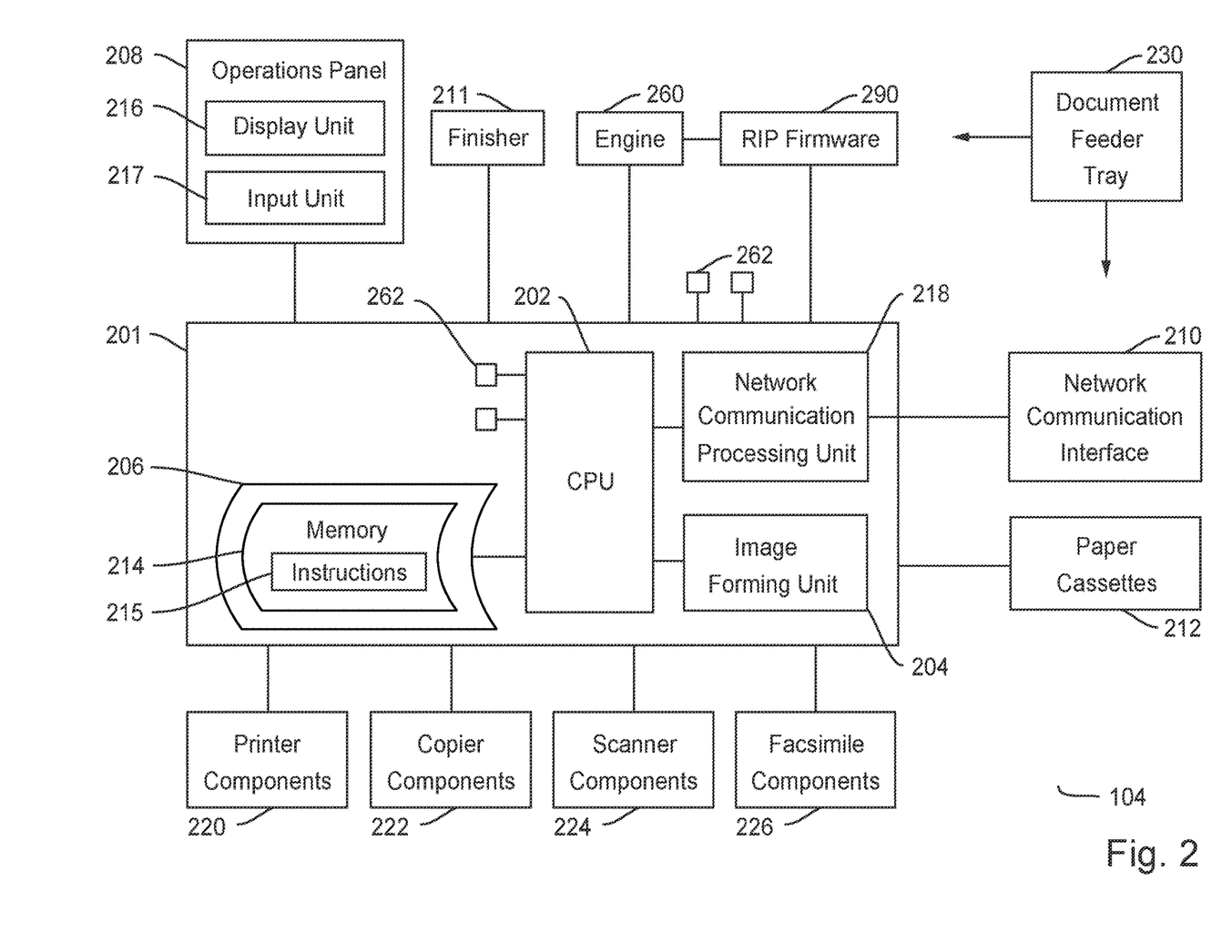
FIG. 2 illustrates a block diagram of components of a printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with color management server 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
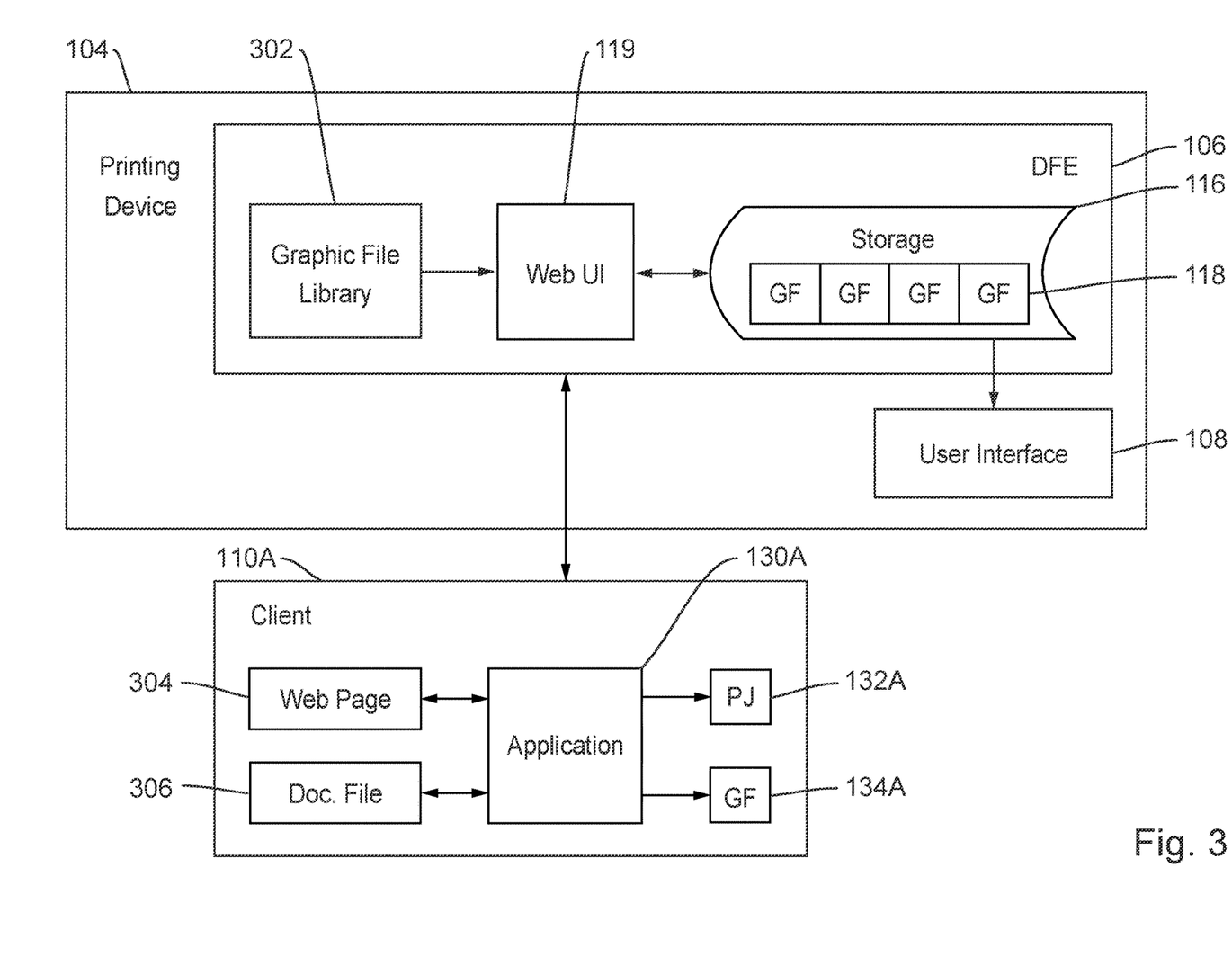
FIG. 3 illustrates a block diagram of the generation of the graphic files using an application at a client device and a web-based user interface of the DFE according to the disclosed embodiments.

FIG. 3 depicts a block diagram of the generation of graphic files 118 using application 130A at client device 110A and web-based user interface 119 of DFE 106 according to the disclosed embodiments. FIG. 3 shows client device 110A along with application 130A, which may generate print job 132A from document file 306 along with graphic file 134A to be submitted to DFE 106, as disclosed above. Document file 306 may be created by application 130A. In some embodiments, document file 306 may be a PDF file having a number of pages. It should be noted that client devices 110B and 110C also may be illustrated in FIG. 3, but are not shown for brevity.

In some embodiments, the submission "client" for providing graphic file 134A to DFE 106 is application 130A. Application 130A may be a desktop application that connects to the DFE and generates the graphic files, or thumbnails, locally. In other embodiments, application 130A may be a user interface application, or app, that the operator interacts with or a service that runs in the background and accepts jobs, then forwards them to printing device 104. The user interface application also may generate graphic file 134A along with sending print job 132A.

Another way to submit graphic files may be using the web-based user interface 119 in embedded DFE 106 that uses, for example, JavaScript™ to download a graphic file generation library 302 to client device 110A from DFE 106 so that graphic files can be generated locally within the web browser. This feature allows graphic file generation to occur anywhere. In general, web-based user interfaces favor server-side processing, or, in this instance, processing at DFE 106. The disclosed embodiments, however, inverts this behavior in order to enable enhanced functionality in DFE 106 by leveraging processing from client device 110A. A web-page 304 may execute on client device 110A to provide access to graphic file generation library 302 at the device. Web-page 304 downloads library 302 to generate graphic file 134A locally on client device 110A.

When web-page 304 is opened, an HTML file is retrieved that has a pointer to other resources that also are retrieved. Further, web-page 304 may result in a script being run on DFE 106, which acts like a little software program that generates the web-page to allow the content of the web-page to be adjusted dynamically to any given client device. This feature may be known as server-side processing. Web-page 304 also may execute JavaScript™ to enable client device 110A to do some of the processing that makes it easier to scale a website for many clients because some processing is done at the client device that opens web-page 304 and not at DFE 106.

In some embodiments, library 302 is pushed to web-page 304 to enable preview generation at client device 110A. Web-page 304 may pull print job 132A to generate a preview for graphic file 134A, and return both to DFE 106. DFE 106 will take the preview as graphic file 134A to use for print job 132A. PDFs can be served to client device 110A one page at a time, for example, if the PDF is optimized for "web view." There is no need to push the entire print job to client device 110A. The pages being viewed by the operator may be used for quick preview generation. Additional pages may be pushed to make a more complete preview in the background.

In some embodiments, there may be instances in which print jobs come through a channel that does not generate graphic files with the print jobs. In these instances, client device 110A may create graphic file 134A for print job 132A that the operator chooses to edit at the client device. Client device 110A may download print job 132A from DFE 106 and generates graphic file 134A locally. Client device 110A may download pages one at a time so that graphic files can be generated more quickly. Client device 110A may show graphic file 134A in the user interface associated with application 130A. Client device 110A then may submit graphic file 134A with print job 132A. Alternatively, graphic file 134A may be submitted separately from print job 132A. Once graphic file 134A is received by DFE, 106, it will be available for other client devices to view, as disclosed above, or for use in user interface 108.

In some embodiments, client device 110A may determine which print jobs 114 in job queue 112 do not have associated graphic files and retrieve them from DFE 106 in order to start generating graphic files in the background. In this way, DFE, 106 may offload processing required to implement graphic files 118 with print jobs 114 to client device 110A as well as centralize these efforts in system 100. Applications and other components on other client devices do not need to be updated to provide this functionality when submitting print jobs to printing device 104.

Figure 4A:
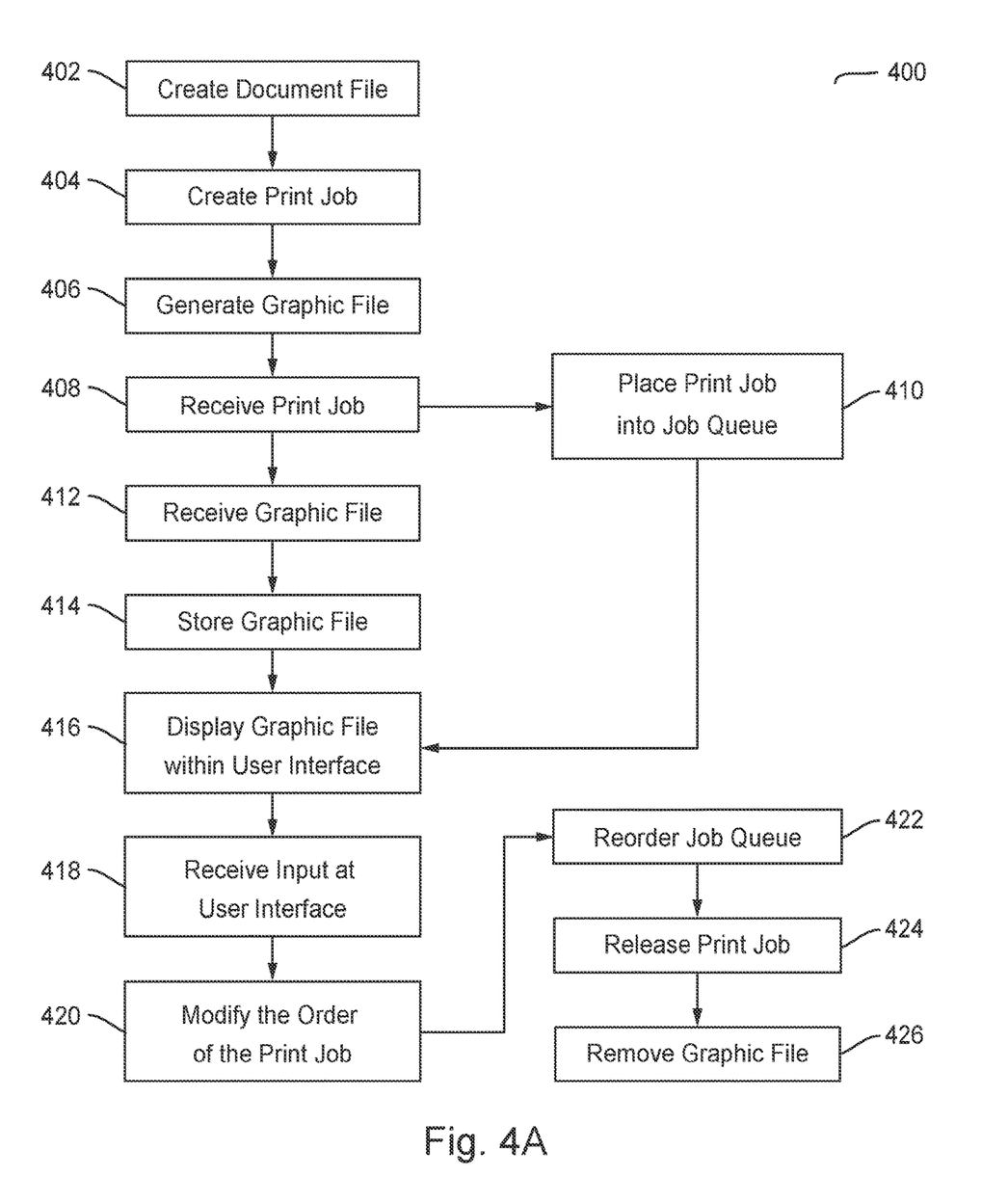
FIG. 4A illustrates a flowchart for managing print jobs in the job queue within the embedded DFE according to the disclosed embodiments.
Figure 4B:
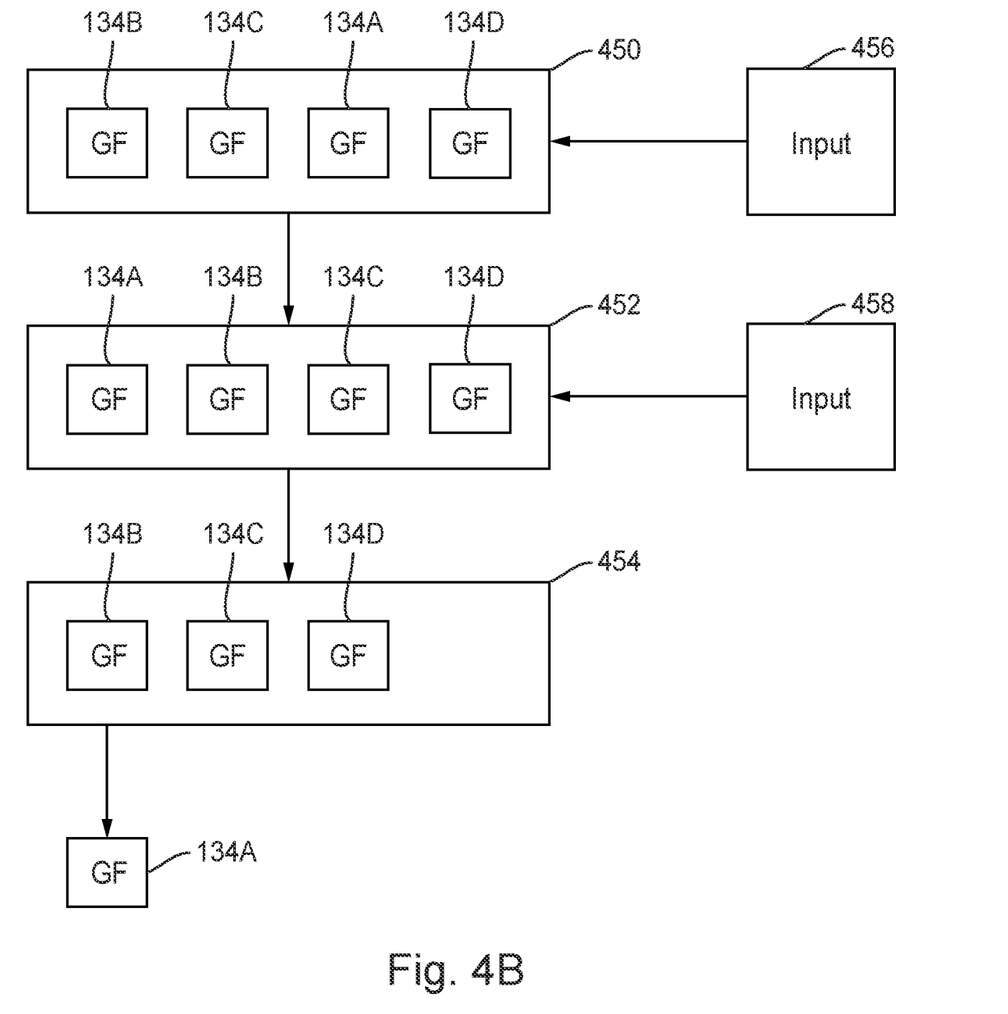
FIG. 4B illustrates a block diagram of a modified order of the print jobs within the job queue using a user interface according to the disclosed embodiments.

FIG. 4A depicts a flowchart 400 for managing print jobs 114 in job queue 112 within embedded DFE 106 according to the disclosed embodiments. FIG. 4B depicts a block diagram of a modified order of print jobs 114 within job queue 112 using user interface 108 according to the disclosed embodiments. FIGS. 1A-3 may be used for illustrative purposes by the embodiments disclosed by FIGS. 4A and 4B. FIGS. 4A and 4B, however, are not limited by FIGS. 1A-3.

Step 402 executes by creating document file 306 using, for example, application 130A on client device 110A. Application 130 may generate document file 306 to include data, such as text or images. Step 404 executes by creating print job 132A from document 306 at client device 110A. Again, application 130A may do so or another application may generate the print job. Print job 132A may include several document files as well.

Step 406 executes by creating graphic file 134A for print job 132A. Graphic file 134A may be generated using components of document file 306. As disclosed above, application 130A may process pages within document file 306 to create graphic file 134A. The disclosed embodiments may go through the document for print job 132A one page at a time and generate images. Graphic file 134A may be generated using existing third party libraries, such as iText™, PDFIUM™, and the like. In this manner, graphic file 134A may be unique to document file 306 and, in turn, print job 132A. Graphic file 134A also may be generated using graphic file generation library 302 and web-page 304 at client device 110A, as disclosed above. Thus, graphic file 134A may not be automatically generated along with print job 132A.

Step 408 executes by receiving print job 132A for document 306 at DFE 106 of printing device 104. Client device 110A may forward print job 132A to printing device 104 using application 130A or another program. Step 410 executes by placing print job 132A into job queue 112 with other print jobs 114. Job queue 112 may include print jobs from other client devices 110B and 110C in system 100 as well as client device 110A.

Step 412 executes by receiving graphic file 134A at DI-E, 106. As disclosed above, graphic file 134A is not necessarily received along with print job 132A. It may be generated later or even at another device within system 100 than print job 132A. At some point, however, graphic file 134A is received within DFE 106 and associated with print job 132A in job queue 112. Step 414 executes by storing graphic file 134A at data storage 116 on DFB 106. Thus, graphic file 134A is kept separate from job queue 112.

Step 416 executes by displaying graphic file 134A along with other graphic files for pending print jobs 114 in job queue 112. Graphic file 134A may be displayed within jobs display 120 to show its place in the order of print jobs 114 within job queue 112. User interface 108 may access graphic files 118 in data storage 116 to obtain those associated with print jobs 114. Some data within print job 132A or graphic file 134A may point to this association so that user interface 108 displays the correct order.

FIG. 4B shows an order 450 of print jobs pending in job queue 112 using graphic files 118. Order 450 is displayed in jobs display 120 on user interface 108 to show the order of print jobs 114 within job queue 112 using graphic files 118. The graphic files displayed, for example, may be graphic files 134B, 134C, 134A, and 134D, which correspond to print jobs 132B, 132C, 132A, and 132D within job queue 112. As shown in order 450, graphic file 134B indicates that print job 132B would be the next job to be processed and printed by DFE 106 and printing device 104. The graphic files uniquely identify the respective print jobs within job queue 112.

Referring back to flowchart 400, step 418 executes by receiving an input 456 at user interface 108. The operator interacts with user interface 108 to provide input 456. Input 456 may be a command to be processed by user interface 108 and presented to DFE 106. The operator may interact with graphic file 134B, 134C, 134A, or 134D to modify order 450. For example, the operator may touch graphic file 134A for print job 132A received from client device 110A to move it within order 450. Alternatively, user interface 108 may receive an instruction from a connected device to move print job 132A within order 450 based on the position of graphic file 134A. For example, a cursor may be used to capture the instruction on the client device.

Step 420 executes by modifying order 450 to move print job 132A using graphic file 134A. Using the example above, graphic file 134A is moved from being third in job queue 112 to first. Step 422 executes by reordering job queue 112 based on the modification using the graphic files within jobs display 120. Thus, order 452 is generated as a result of input 456 modifying the print order of print jobs 132A, 132B, 132C, and 132D. Print job 132A is moved to the front of the queue to be printed next at printing device 104, followed by print jobs 132B, 132C, and 132D. Further, graphic file 134A is shown in jobs display 120 to indicate the new position for print job 132A. Order 452 also may be viewable by client devices accessing user interface 108 to view the print order for pending print jobs.

Step 424 executes by releasing print job 132A for printing at printing device 104. Referring to FIG. 4B, input 458 is received via user interface 108 to release print job 132A using graphic file 134A. The operator may highlight graphic file 134A and provide input 458 to release its associated print job. Order 454 may result with the release of print job 132A. The operator also may release other print jobs using their associated graphic files. Step 426 executes by removing graphic file 134A from order 454 and, in turn, from jobs display 120 on user interface 108. This action indicates that print job 132A is released and sent for printing operations.

Thus, graphic files associated with print jobs in the job queue are used to not only indicate what print jobs are pending but also to allow an operator perform actions on the job queue. As the graphic files, as thumbnails, uniquely identify the print jobs, the operator can view what a pending print job looks like to make any decisions or modifications necessary for printing pending documents. As disclosed above, the graphic files may or may not be generated with the print jobs. If not, then the disclosed embodiments provide for generating the appropriate graphic file for a print job without one so that every print job in the job queue is represented with a graphic file.

Figure 5:
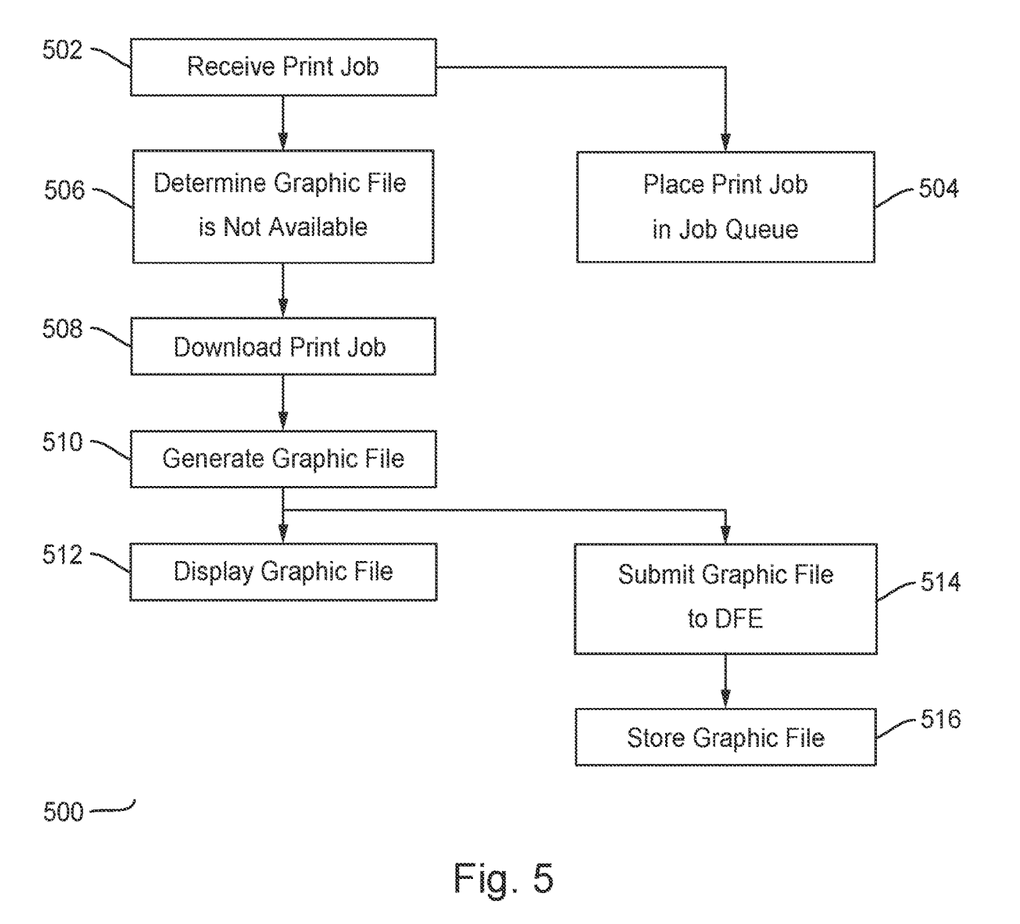
FIG. 5 illustrates a flowchart for managing print jobs in the job queue that do not have graphic files according to the disclosed embodiments.

FIG. 5 depicts a flowchart 500 for managing print jobs 114 in job queue 112 that do not have graphic files 118 according to the disclosed embodiments. FIGS. 1A-4B may be referred to for illustrative purposes by the embodiments disclosed by flowchart 500. Flowchart 500, however, is not limited by the disclosures of FIGS. 1A-4B. It also should be noted that steps applicable to flowchart 500 already disclosed by flowchart 400 may not be repeated in FIG. 5.

Step 502 executes by receiving print job 132A at DFE 106, as disclosed in step 408 in flowchart 400. Print job 132A is placed in job queue 112 in step 504, similar to step 410 disclosed above. Step 506 executes by determining a graphic file is not available for recently received print job 132A. As disclosed above, there may be instances where a graphic file is not generated with the print job or one is not provided from the client device attached to printing device 104. The disclosed embodiments may select a client device to generate the graphic files as needed when it is determined that one is not provided with the print job. Alternatively, an operator may use a client device to select print jobs for which to generate graphic files as needed.

Step 508 executes by downloading print job 132A to client device 110A, 110B, or 110C. For example, even though print job 132A may be created at client device 110A, its graphic file may be generated at another client device within system 100, such as client device 110B. Perhaps application 130A on client device 110A does not have the functionality to generate a graphic file while application 130B on client device 110B does. Print job 132A is downloaded from embedded DFE 106 to the client device.

Step 510 executes by generating graphic file 134A based on print job 132A at the client device. This step may be similar to step 406 disclosed in flowchart 400. Pages may be downloaded one page at time so that graphic file 134A may be generated more quickly. Step 512 executes by displaying graphic file 134A for print job 132A in a user interface at the client device, or, alternatively, in user interface 108. Graphic file 134A may replace an icon or other generic graphic representing print job 132A. Step 514 executes by submitting graphic file 134A to DFE 106. The client device may submit graphic file 134A back with print job 132A, or may submit it separately. DFE 106 may use graphic file 134A as disclosed above to represent print job 132A within job queue 112. Step 516 executes by storing graphic file 134A in data storage 116 at DFE 106.

The disclosed embodiments provide functionality even to embedded DFEs. By relying on client devices to generate and submit the graphic files, or thumbnails, the disclosed embodiments allow the user interface in the embedded DFE to provide a job management experience that is closer to that of a server DFE without requiring the more powerful hardware and cost associated with a server DFE. A legacy DFE also may adopt this functionality without having to upgrade components thereon as the functionality may be pushed to client devices as needed.

These features eliminate the need for customers that require production job management but do not require high performance job processing to acquire the functionality that may be needed without incurring the expense of a server DFE or upgrades to the embedded DFE. These features also provide a price advantage to the vendor as they allow them to offer a lower cost offering that meets the customer's requirements.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A printing system comprising:
an embedded digital front end (DFE) located within a printing device, wherein the embedded DFE includes a job queue for a plurality of print jobs received at the printing device;
a client to submit a print job to the embedded DFE for placement in the job queue,
wherein the client downloads a graphic file generation library from the embedded DFE, and
wherein the client generates a document file for the print job and the client generates a graphic file using the graphic file generation library to represent the document file for the print job; and
a user interface that communicates with the embedded DFE and displays a plurality of graphic files corresponding to a plurality of print jobs in the job queue, wherein an input to the user interface modifies an order of the plurality of print jobs in the job queue,
wherein the embedded DFE receives the print job and the graphic file from the client, and
wherein the print job for the document file is placed in the job queue with the plurality of print jobs.

2. The printing system of claim 1, wherein the client is an application executing on a device connected to the printing device.

3. The printing system of claim 1, wherein the client accesses a web-based interface to generate the graphic file.

4. The printing system of claim 3, wherein the web-based interface pushes the graphic file generation library to the client.

5. The printing system of claim 1, wherein the graphic file of the print job is used by the embedded DFE to indicate the print job within the user interface.

6. The printing system of claim 1, wherein the user interface is hosted on a device connected to the printing device.

7. The printing system of claim 1, wherein the user interface is located on a device connected to the embedded DFE.

8. A method for managing a job queue at a printing device, the method comprising:
- creating a print job for a document file at a client;
- downloading a graphic file generation library to the client from an embedded digital front end (DFE) located within the printing device;
- generating a graphic file for the print job at the client using the graphic file generation library, wherein the graphic file represents to the document file;
- receiving the print job at the embedded DFE the printing device;
- placing the print job in the job queue with a plurality of print jobs;
- displaying the graphic file for the print job within a user interface to indicate a position in the job queue with the plurality of print jobs; and
- modifying an order of the print job within the job queue using the graphic file.

9. The method of claim 8, further comprising storing the graphic file at the embedded DFE.

10. The method of claim 8, wherein the client is hosted by a device connected to the printing device.

11. The method of claim 8, further comprising displaying the graphic file using a web-based page hosted by the embedded DFE of the printing device.

12. The method of claim 8, further comprising receiving an input at the user interface corresponding to the graphic file for the print job.

13. The method of claim 8, further comprising releasing the print job to print at the printing device using the graphical file in the user interface.

14. The method of claim 8, wherein the graphical file includes a component from the document file.

15. A method for managing a job queue at a printing device, the method comprising:
- creating a print job for a document file at a client;
- receiving the print job at an embedded digital front end (DFE) located within the printing device;
- placing the print job in the job queue with a plurality of print jobs;
- determining that the print job does not include a graphic file;
- downloading a graphic file generation library to the client from the embedded DFE located within the printing device;
- generating a graphic file for the print job at the client using the graphic file generation library, wherein the graphic file represents the document file;
- displaying the graphic file for the print job within a user interface to indicate a position in the job queue with the plurality of print jobs; and
- modifying an order of the print job within the job queue using the graphic file.

16. The method of claim 15, further comprising storing the graphic file at a data storage at the embedded DFE.

17. The method of claim 15, wherein the client is hosted by a device connected to the printing device.

18. The method of claim 15, wherein the generating the graphic file includes generating the graphic file using a web-based page at the client.

19. The method of claim 15, further comprising releasing the print job to print at the printing device using the graphical file in the user interface.

20. The method of claim 15, wherein the graphical file includes a component from the document file.

\* \* \* \* \*